United States Patent [19]

Ahmed

[11] Patent Number: 5,025,457
[45] Date of Patent: Jun. 18, 1991

[54] SYNCHRONIZING CONTINUOUS BIT STREAM ORIENTED TERMINALS IN A COMMUNICATIONS NETWORK

[75] Inventor: Hassan M. Ahmed, Wrentham, Mass.

[73] Assignee: Codex Corporation, Mansfield, Mass.

[21] Appl. No.: 341,647

[22] Filed: Apr. 21, 1989

[51] Int. Cl.$^5$ .............................................. H04L 7/00
[52] U.S. Cl. ................................... 375/106; 370/941; 370/100.1
[58] Field of Search ....................... 375/106, 112, 118; 370/105.3, 100.1, 101, 941, 60; 360/51

[56] References Cited

U.S. PATENT DOCUMENTS

| 4,672,482 | 6/1987 | Troletti | 360/51 |
| 4,752,837 | 6/1988 | DeLand, Jr. | 360/51 |
| 4,872,073 | 10/1989 | Fincher et al. | 370/101 |

OTHER PUBLICATIONS

DePrycker et al., "Terminal Synchronization in Asynchronous Networks", *Proc. of 1987 International Conference on Communications*, Jun. 1987, Seattle, Wash., pp. 800–807.
Montgomery, "Techniques for Packet Voice Synchronization", IEEE Journal on Selected Areas in Communications, vol. Sac-1, No. 6, Dec. 1983, p. 1022.
Cochennec et al., "Asychronous Time-Division Networks: Terminal Synchronization for Video and Audio Signals," *Proc. 1985 Global Telecommunications Conference* (Globecom), Dec. 1985, New Orleans, La., pp. 791–794.
DePrycker et al., "Performance of a Service Independent Switching Network with Distributed Control", IEEE Journal on Selected Areas in Communications, vol. Sac-5, No. 8, Oct. 1987, p. 1293.

Primary Examiner—Benedict V. Safourek
Assistant Examiner—Marianne Huseman
Attorney, Agent, or Firm—Fish & Richardson

[57] ABSTRACT

The frequency of a clock for a receiving terminal is controlled based on a predetermined clock frequency of a terminal that produces a continuous stream of data at a predetermined frequency for transmission to the receiving terminal over a communications network of the kind in which data is transmitted between the terminals in discrete packets that are delayed on the network by possibly different amounts. Arrivals of packets that are sent to the receiving terminal are detected, time intervals between the arrivals of the successive packets are determined, and the time intervals are processed to generate an estimate that is related to the predetermined frequency. The frequency of the receiving terminal clock is controlled in response to the estimate. In one aspect, the time intervals are determined by measuring time differences of arrival between successive packets, and the measured time differences are filtered to generate the estimate. In another aspect, the time intervals are determined by measuring phase differences between a reference signal (that indicates the arrival of each packet) and the receiving terminal clock, and the measured phase differences are filtered to generate the estimate.

36 Claims, 13 Drawing Sheets

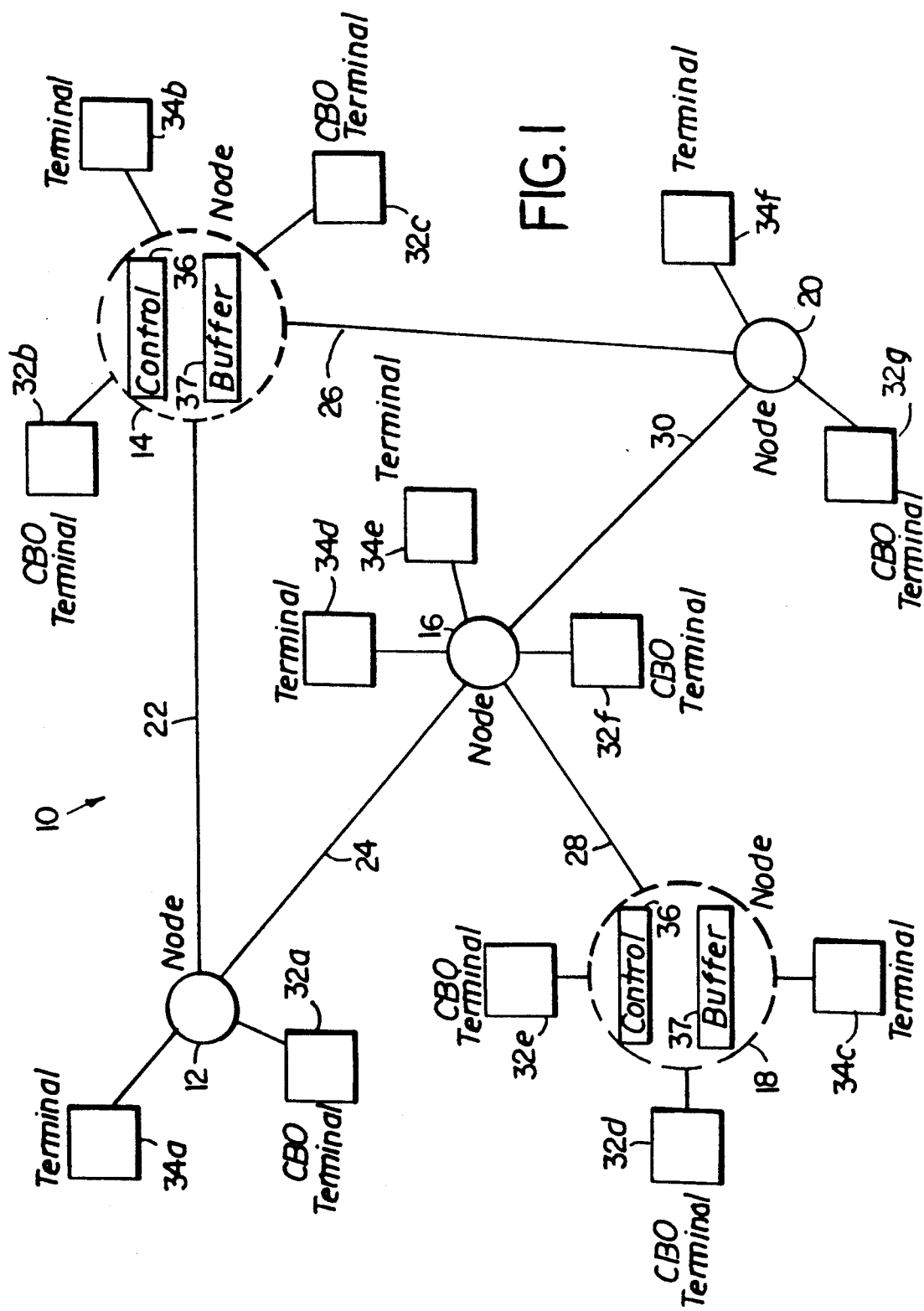

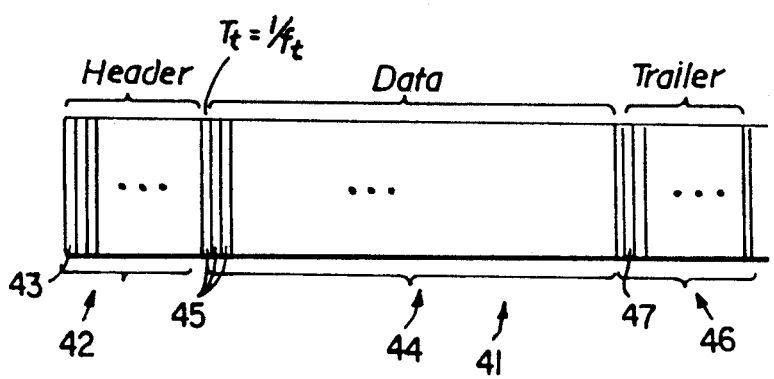
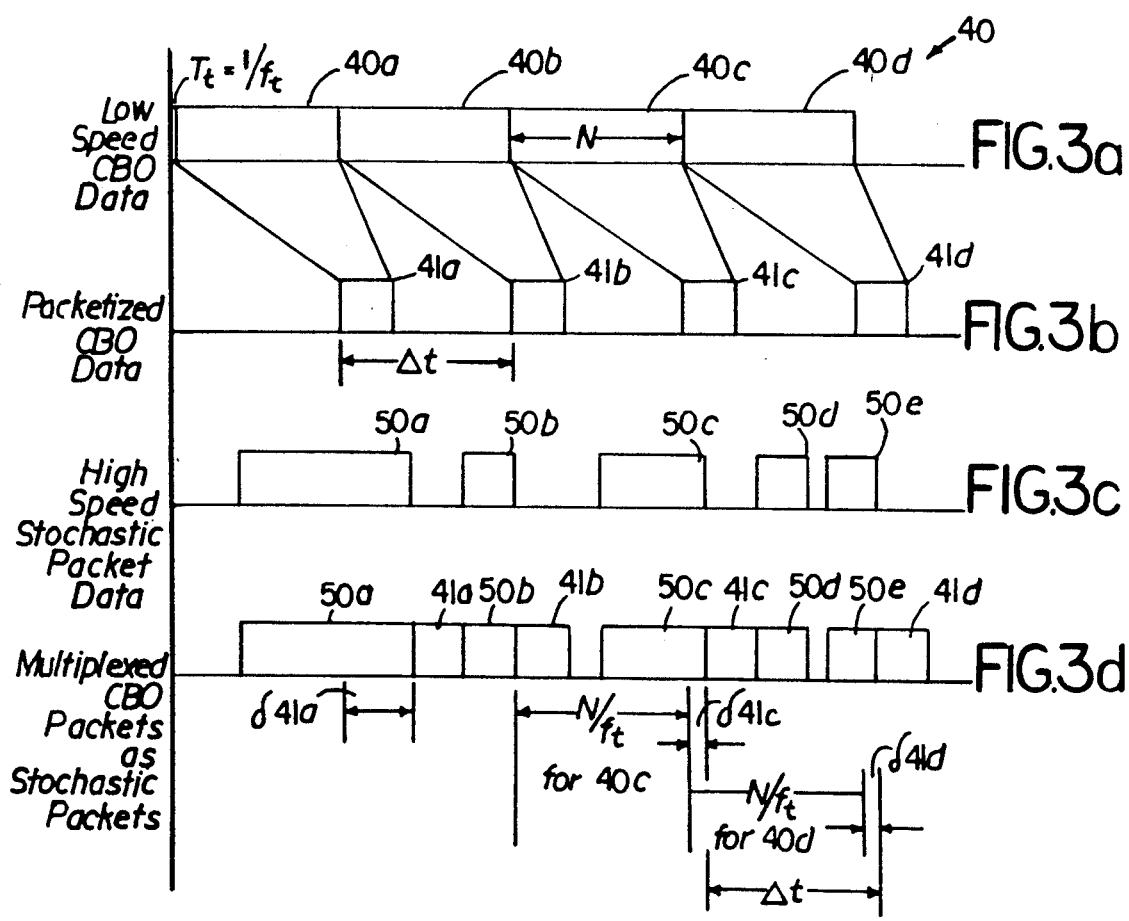

$$\overline{\Delta t(k)} = \frac{1}{W} \sum_{i=0}^{W-1} \Delta t(k-i) \qquad (9)$$

$$\hat{T}_t(k) = \frac{1}{N} \left\{ \frac{1}{W} \sum_{i=0}^{W-1} \Delta t(k-i) \right\} \qquad (10)$$

$$\left( \frac{\hat{T}_t(k) - T_t}{T_t} \right) = J(k) \qquad (11)$$

$$\hat{T}_t(k) = T_t + \frac{\overline{\Delta \delta(k)}}{N} \qquad (12)$$

$$E\left\{ \left| \frac{\hat{T}_t(k) - T_t}{T_t} \right| \right\} < J_{max} \qquad (13)$$

$$\left\{ \frac{\hat{T}_t(k) - T_t}{T_t} \right\}^2 = J^2_{(k)} \qquad (14)$$

$$E\left\{ \left[ \frac{\hat{T}_t(k) - T_t}{T_t} \right]^2 \right\} \leq J^2_{max} \qquad (15)$$

$$E\left\{ \left[ \frac{\overline{\Delta \delta(k)}}{NT_t} \right]^2 \right\} \leq J^2_{max} \qquad (16)$$

FIG. 7a

FIG.7b $$\overline{\Delta\delta(k)} = \frac{\delta(k) - \delta(k-w)}{w} \tag{17}$$

$$E\{\delta(k)\} = \mu_\delta \tag{18}$$

$$\overline{\Delta\delta(k)} = \frac{\delta(k) - \mu_\delta - \delta(k-w) + \mu_\delta}{w} \tag{19}$$

$$\overline{\Delta\delta(k)} = \frac{(\delta(k) - \mu_\delta) - (\delta(k-w) - \mu_\delta)}{w} \tag{20}$$

$$\overline{\Delta\delta(k)}^2 = \frac{1}{w^2}\left\{(\delta(k)-\mu_\delta)^2 - 2(\delta(k)-\mu_\delta)(\delta(k-w)-\mu_\delta) + (\delta(k-w)-\mu_\delta)^2\right\} \tag{21}$$

$$E\left[\left(\overline{\Delta\delta(k)}\right)^2\right] = \frac{1}{w^2}\left\{E[(\delta(k)-\mu_\delta)^2] + E[(\delta(k-w)-\mu_\delta)^2] - 2E[(\delta(k)-\mu_\delta)(\delta(k-w)-\mu_\delta)]\right\} \tag{22}$$

$$E[(\delta(k)-\mu_\delta)^2] = E[(\delta(k-w)-\mu_\delta)^2] = \sigma_\delta^2 \tag{23}$$

$$E[(\delta(k)-\mu_\delta)(\delta(k-w)-\mu_\delta)] = E\left\{\delta(k)\delta(k-w) + \mu_\delta^2 - \mu_\delta\delta(k) - \mu_\delta\delta(k-w)\right\} \tag{24}$$

$$E[(\delta(k)-\mu_\delta)(\delta(k-w)-\mu_\delta)] = E[\delta(k)\delta(k-w)] + E[(\mu_\delta)^2] - E[\mu_\delta[\delta(k) + \delta(k-w)]] \tag{25}$$

$$E[(\delta(k)-\mu_\delta)(\delta(k-w)-\mu_\delta)] = \mu_\delta^2 - 2\mu_\delta^2 + \mu_\delta^2 = 0 \tag{26}$$

$$E[(\overline{\Delta\delta(k)})^2] = \frac{2\sigma_\delta^2}{w^2} \tag{27}$$

$$P\left[\left|\frac{\overline{\Delta\delta(k)}}{NT_t}\right| \leq J_{max}\right] \geq \alpha \quad (30)$$

$$F_k(J_{max} NT_t) - F_k(-J_{max} NT_t) \geq \alpha \quad (31)$$

$$f_{\Delta\delta}(d) = f_\delta(d) * f_\delta(-d) \quad (36)$$

$$f_\delta(d) = \mu e^{-\mu d} \quad (37)$$

$$f_{\Delta\delta}(d) = \frac{\mu}{2} e^{-\mu|d|} \quad (38)$$

$$f_k(a) = \frac{\mu W}{2} e^{-\mu|aW|} \quad (39)$$

$$E[(\overline{\Delta\delta(k)})^2] < T_t^2 N^2 J_{max}^2 \quad (41)$$

$$\phi\left(\frac{J_{max} NT_t \sqrt{W}}{\sigma_\delta}\right) - \phi\left(\frac{-J_{max} NT_t \sqrt{W}}{\sigma_\delta}\right) \geq \alpha \quad (43)$$

$$\overline{\Delta t(k)} = \left(\frac{1}{W}\right) \sum_{i=0}^{W-1} [N(k-i)T_t + \delta(k-i) - \delta(k-i-1)] \quad (45)$$

$$\overline{\Delta t(k)} = \left(\frac{1}{W}\right) \sum_{i=0}^{W-1} N(k-i)T_t + \frac{1}{W} \sum_{i=0}^{W-1} (\delta(k-i) - \delta(k-i-1)) \quad (46)$$

$$E\left\{\frac{1}{W} \sum_{i=0}^{W-1} \delta(k-i) - \delta(k-i-1)\right\} = 0 \quad (46a)$$

$$T_r(k) = \hat{T}_t(k) * G(1-G)^k \qquad (50)$$

$$* \equiv \text{convolution}$$

$$T_r(k) = T_t - T_t(1-G)^k + \epsilon(k) * [G(1-G)^k] \qquad (51)$$

$$R(k) = \left\{ \frac{T_t}{W} \right\} [u(L) - u(L+W)] * G(1-G)^k \qquad (52)$$

$$R(k) = \left\{ \frac{T_t}{W} \right\} [1 - (1-G)^{k-L+1}]$$
$$\text{for } L \leq k < L+W \qquad (53)$$

$$R(k) = \left\{ \frac{T_t}{W} \right\} [(1-G)^{-W} - 1](1-G)^{k-L+1}$$
$$\text{for } k \geq L+W \qquad (54)$$

$$R(k) = 0 \qquad (55)$$
$$\text{otherwise}$$

$$\sum_{k=L}^{\infty} R(k) = \sum_{k=L}^{L+W-1} R(k) + \sum_{L+W}^{\infty} R(k) \qquad (56)$$

$$\sum_{k=0}^{\infty} R(k) = \sum_{k=0}^{W-1} \left\{ \frac{T_t}{W} \right\} [1 - (1-G)^{k+1}] +$$
$$\sum_{k=W}^{\infty} \left\{ \frac{T_t}{W} \right\} [(1-G)^{-W} - 1](1-G)^{k+1} \qquad (57)$$

FIG. 11a $$\sum_{k=0}^{\infty} R(k) = \sum_{k=0}^{W-1} \left\{ \frac{T_t}{W} \right\} - \sum_{k=0}^{W-1} \left\{ \frac{T_t}{W} \right\} (1-G)^{k+1} -$$

$$\sum_{k=W}^{\infty} \left\{ \frac{T_t}{W} \right\} (1-G)^{k+1} + \sum_{k=W}^{\infty} \left\{ \frac{T_t}{W} \right\} (1-G)^{k-W+1} \quad (58)$$

$$\sum_{k=0}^{\infty} R(k) = \sum_{k=0}^{W-1} \left\{ \frac{T_t}{W} \right\} - \sum_{k=0}^{\infty} \left\{ \frac{T_t}{W} \right\} (1-G)^{k+1} + \sum_{k=W}^{\infty} \left\{ \frac{T_t}{W} \right\} (1-G)^{k-W+1}$$
(59)

$$\sum_{k=0}^{\infty} R(k) = T_t - \sum_{k=0}^{\infty} \left\{ \frac{T_t}{W} \right\} (1-G)^{k+1} + \sum_{\ell=0}^{\infty} \left\{ \frac{T_t}{W} \right\} (1-G)^{\ell+1}$$
(60)

$$\sum_{k=0}^{\infty} R(k) = T_t$$
(61)

FIG. 11b $$T_s = N\, T_r(k) \tag{64}$$

$$T_{ref} = NT_t - (\delta(k) - \delta(k+1)) \tag{65}$$

$$\Delta\emptyset(k+1) = \emptyset(k+1) - \emptyset(k) = N[T_r(k) - T_t] + (\delta(k) - \delta(k+1)) \tag{66}$$

SYNCHRONIZING CONTINUOUS BIT STREAM ORIENTED TERMINALS IN A COMMUNICATIONS NETWORK

BACKGROUND OF THE INVENTION

This invention relates to synchronizing the clocks of devices, such as independent continuous bit stream oriented (CBO) data terminals, in a communications network in which packets of data are sent over the network.

Typically, such a communications network includes a number of nodes interconnected by links, each node serving one or more data terminals. The nodes each function as a so-called "concentrator" to arrange data to be transmitted from one of its terminals to a terminal served by another node into discrete packets for transmission over the one or more links between the nodes. The node inserts a "header" in each packet (that may identify the originating terminal and the destination terminal) along with a predetermined number of bits of data, and a "trailer" to indicate the end of the packet. To prevent and/or deal with collisions between packets on the network, the nodes transmit their packets in an asynchronous manner, for example, according to a predetermined transmission protocol (e g., X.25, etc.). The nodes generally transmit the packets at a rate (such as 64,000 bits/second) that is higher than that used by the terminals (e.g., 9,600 bits/second). The receiving node stores incoming packets in a buffer until they are retrieved by the destination terminal.

Some types of data terminals used in such a communication network transmit data noncontinuously in bursts The clocks in these types of terminals are synchronized during the relatively frequent idle intervals between transmissions.

Other kinds of data terminals transmit data and expect to receive data continuously. These terminals, known as continuous bit stream oriented (CBO) terminals, do not provide a regularly occurring, idle interval during which their clocks can be synchronized. When the clocks of transmitting and receiving CBO terminals are not synchronized, the receiving CBO terminal will retrieve data from the buffer of its node either more slowly or more rapidly than data from the transmitting terminal is placed into the buffer. If this persists, the buffer will eventually overflow or be emptied, leading to loss of transmitted data in the former case or, in the case of the latter, display of incorrect data by the receiving terminal (which continues to "retrieve" data from the empty buffer).

Synchronization of the clocks of the CBO terminals is complicated by the fact that the received bit stream does not directly indicate the timing of the transmitting CBO terminal. Also, the intervals between the arrivals of successive packets vary because the network may itself introduce random (i.e., stochastic) delays during the transmission of different packets. Further, the nodes may add to the variability of packet arrival times by multiplexing transmission of data packets from CBO terminals with data packets from other types of data terminals in the network.

One synchronization scheme, described in "Terminal Synchronization in Asynchronous Networks," by DePrycker et al, IEEE International Conference on Communications, June, 1987, pages 800–807, monitors the level of (i.e., the number of packets in) the data buffer of the receiving node to determine the time taken for the buffer level to change by one packet. To avoid errors caused by stochastic network delays in which fluctuations in the filling level of the buffer also vary due to the stochastic interarrival times between packets, the buffer level is measured each time that a packet is removed and that level is averaged over a predetermined interval. When the expected buffer level shows a change of one half of a packet (determined from the average buffer level in a statistical sense to any desired level of confidence) the buffer size is deemed to have grown by one packet. The time taken for this to happen indicates the frequency offset between the transmitting and receiving terminals. The clock of the receiving terminal is then adjusted by twice this amount in the proper direction to restore the buffer level. Then, the clock is readjusted to the frequency which would remove the calculated offset and the measurement and adjustment procedure begins again.

SUMMARY OF THE INVENTION

The invention features, in general, controlling the frequency of a clock for a receiving terminal based on a predetermined clock frequency of a terminal that produces a continuous stream of data at a predetermined frequency for transmission to the receiving terminal over a communications network of the kind in which data is transmitted between the terminals in discrete packets that are delayed on the network by possibly different amounts, by: detecting arrivals of packets that are sent to the receiving terminal; determining time intervals between the arrivals of successive packets; processing the time intervals to generate an estimate that is related to the predetermined frequency; and controlling the frequency of the receiving terminal clock in response to the estimate.

Preferred embodiments include the following features.

In one aspect, the time intervals are determined by measuring time differences of arrival between successive packets, and filtering them to generate the estimate. The estimate is an estimate of the period of the predetermined frequency, and the measuring, filtering, and controlling steps are performed each time that a packet arrives to adaptively control the frequency of the receiving terminal clock.

In one embodiment, the filtering includes averaging the measured time differences of arrival over a predetermined number, W, of packets that have arrived. The average is determined only for the W most recent packets that have arrived, and W is selected to maintain jitter in the estimate below a predetermined level. Alternatively, W is selected to maintain the jitter below the predetermined level within a predetermined level of confidence.

In another embodiment, the filtering includes exponentially averaging the measured time differences of arrival.

In yet another embodiment, the filtering is done by performing a growing memory average on the measured time differences of arrival. In these last two filtering techniques, averaging is performed over all packets that have arrived.

The filtering is performed using a hardware filter, or in a processor that executes a computer program on the measured time differences of arrival to perform the averaging.

Errors between the period estimate and a current period of the clock frequency for said receiving terminal are determined, and the frequency of said receiving terminal clock is adjusted to cancel the errors. Preferably, the error determining and frequency adjusting are performed in a first order tracking loop that includes the receiving terminal clock. The time differences of arrival comprise a time series of values, and the time series is decimated by a predetermined factor prior to filtering.

In another aspect, the time intervals are determined by measuring phase differences between a reference signal (that indicates the arrival of each packet) and the receiving terminal clock, and the measured phase differences are filtered to generate the estimate. In this case, the estimate is an estimate of a difference between the predetermined frequency and the frequency of the receiving terminal clock. The generating, measuring, filtering, and controlling steps are performed each time that a packet arrives to adaptively control the frequency of the receiving terminal clock.

In one embodiment, the filtering includes averaging the measured phase differences over a predetermined number, W, of packets that have arrived. The average is determined only for the W most recent packets that have arrived, and W is selected to maintain jitter in the estimate below a predetermined level. Alternatively, W is selected to maintain the jitter below the predetermined level within a predetermined level of confidence.

In another embodiment, the filtering includes exponentially averaging the measured phase differences. In yet another, the filtering includes performing a growing memory average on the measured phase differences. In these two filtering methods, the averaging is performed over all packets that have arrived.

The filtering is performed using a hardware filter, or in a processor that executes a computer program on the measured phase differences to perform the averaging.

The frequency of the receiving terminal clock is adjusted to cancel differences between the predetermined frequency and the frequency of the receiving terminal clock. The measuring, filtering, and adjusting steps are performed with a phase lock loop that includes the receiving terminal clock and that is driven by the reference signal. The phase differences comprise a time series of values, and the time series is decimated by a predetermined factor prior to filtering.

The reference signal has a frequency that represents the predetermined frequency divided by 2N, where N is a number of data bits in each packet, and the frequency of the receiving terminal clock is divided by 2N before measuring the phase differences. Alternatively, the frequency of the receiving terminal clock is divided by 2 mN, where m is the predetermined decimation factor.

Packets that have arrived are stored in a buffer for retrieval by the receiving terminal; the number of packets that are stored in the buffer is monitored to determine if the number is within a predetermined range, and, if the number is not within that range, the frequency of the receiving terminal clock is changed without regard to the estimate until the number of packets is within the predetermined range.

The invention provides simple, accurate, and efficient techniques for controlling the clock frequency of the receiving terminal (e.g., a continuous bit stream oriented (CBO) terminal) based on the arrivals of data packets from the network. Because the techniques respond to each new packet to adjust the receiving terminal clock to, e.g., match (or closely approximate) the frequency of the transmitting terminal, the techniques are continuously adaptive to changes in the transmitting frequency. This significantly reduces the risk of buffer overrun or underrun compared to prior techniques which adjust the receiving terminal clock based on measurements of buffer level.

Other features and advantages of the invention may become apparent from the following detailed description, and from the claims.

DESCRIPTION OF THE PREFERRED EMBODIMENTS

We first briefly describe the drawings.

FIG. 1 is a block diagram of a communications network.

FIG. 2 depicts a packet of data that is transmitted on the network of FIG. 1.

FIGS. 3A-3D are useful in understanding the transmission of packets on the network.

FIGS. 7a-b is a list of equations useful in understanding the theory of the invention.

FIG. 8 is a list of equations useful in understanding the calculation of sample size.

FIG. 9 is a list of equations useful in understanding a feature of the invention.

Figure 4:
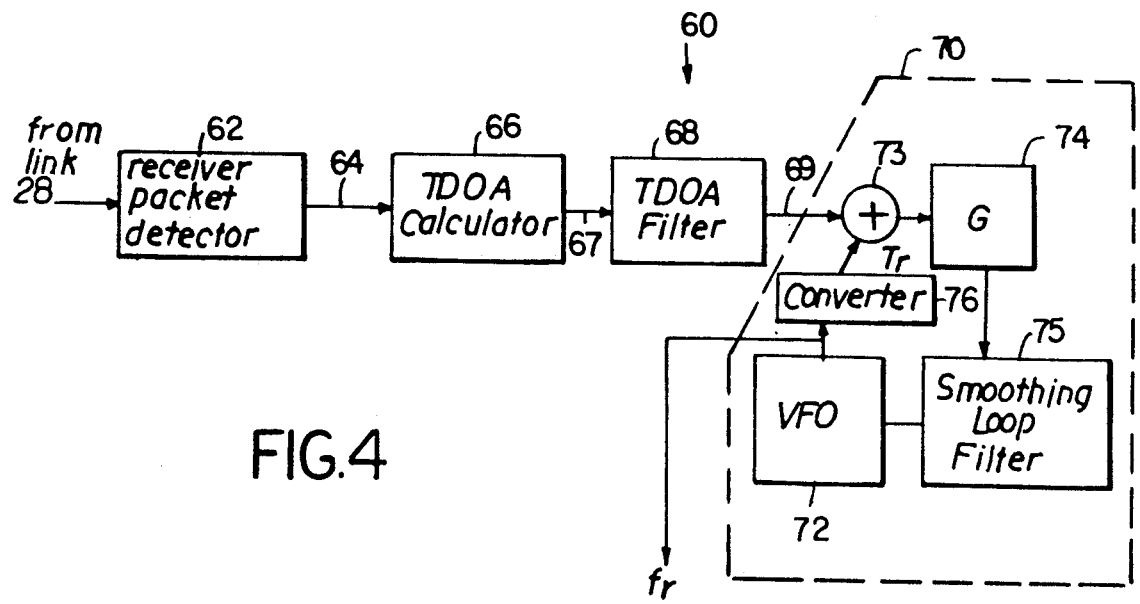
FIG. 4 is a block diagram of one embodiment of the invention for synchronizing the clock of a receiving terminal in the network with that of a transmitting terminal.
Figure 10:
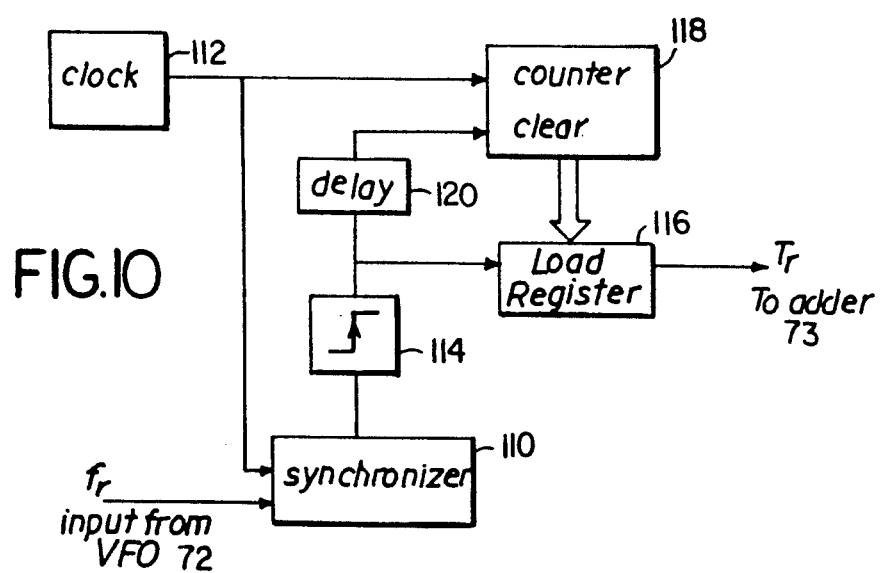

FIG. 10 is a diagram of another block of FIG. 4.

FIGS. 11a-b is a list of equations useful in understanding the effect of a lost packet.

Figure 12A:
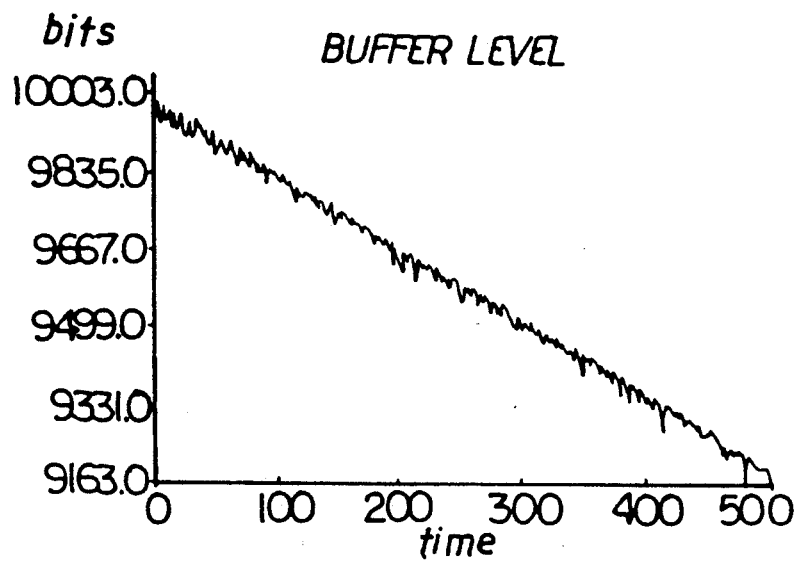
Figure 12B:
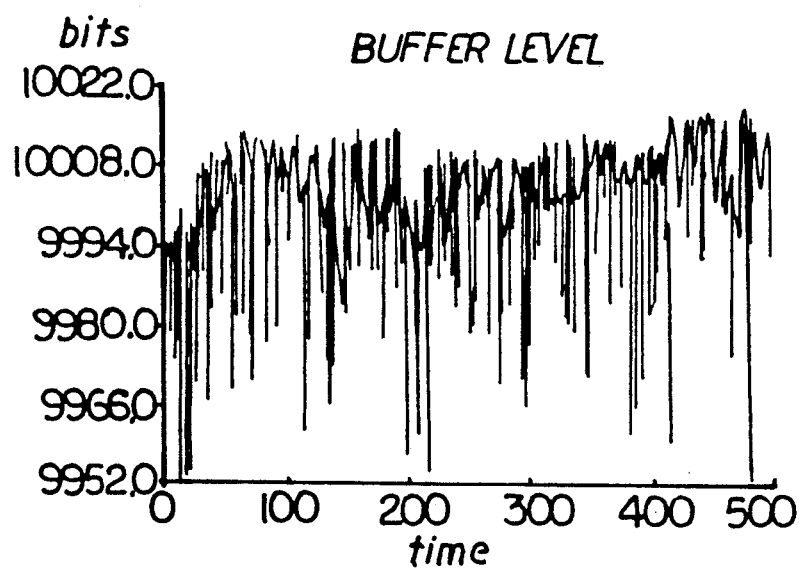

FIGS. 12A and 12B are diagrams of simulation results useful in understanding the operation of the embodiment of the invention shown in FIG. 4.

Figure 6:
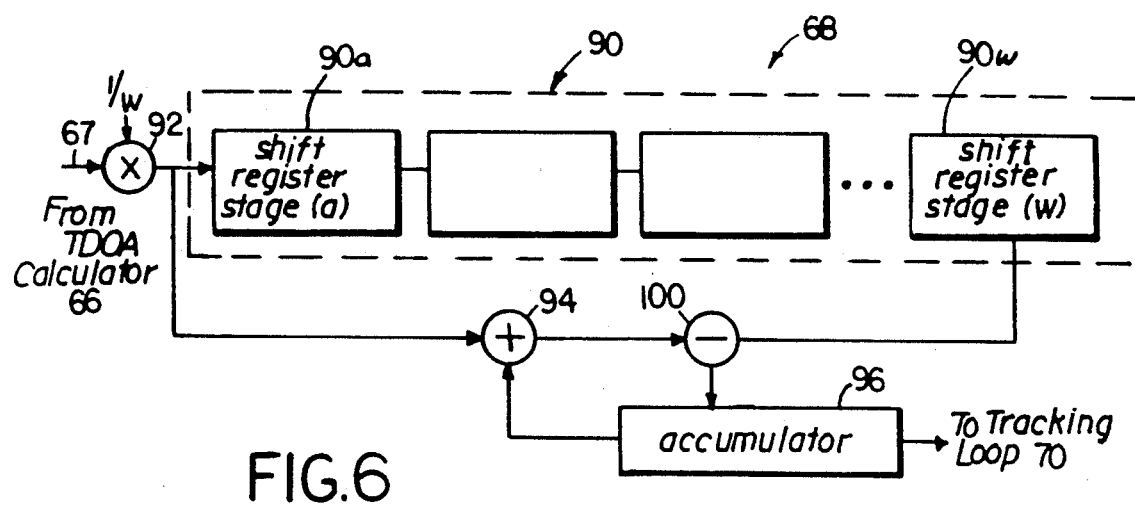
FIG. 6 is a diagram of an another one of the blocks of FIG. 4.
Figure 13:
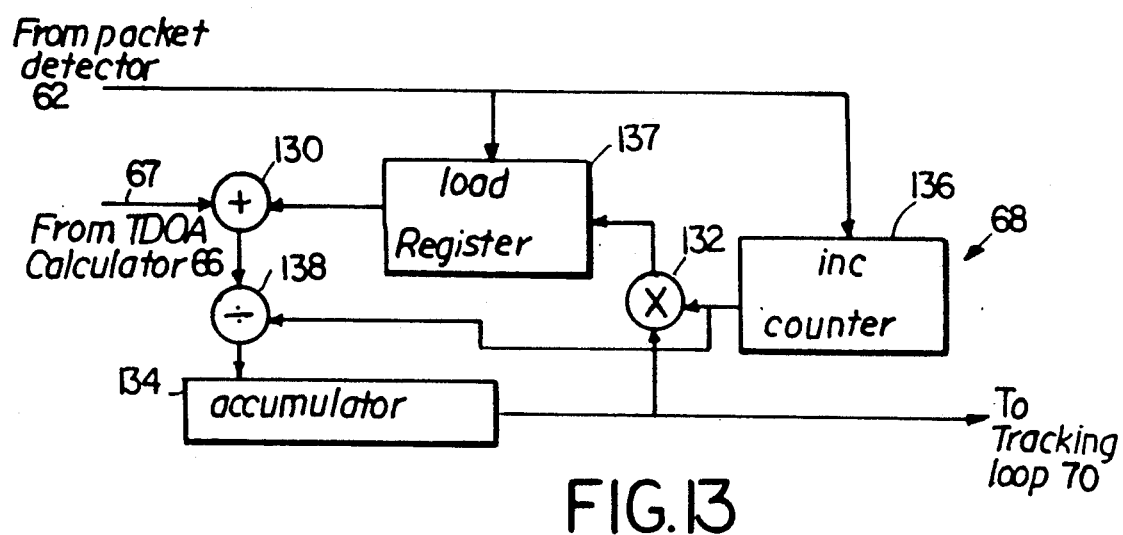

FIG. 13 is a diagram of an alternate embodiment of the block of FIG. 6.

Figure 14:
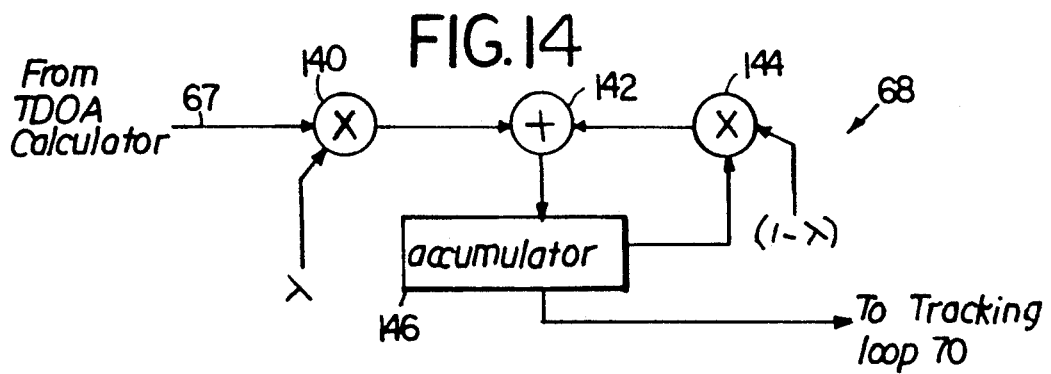

FIG. 14 is a diagram of another embodiment of the block of FIG. 6.

Figure 15:
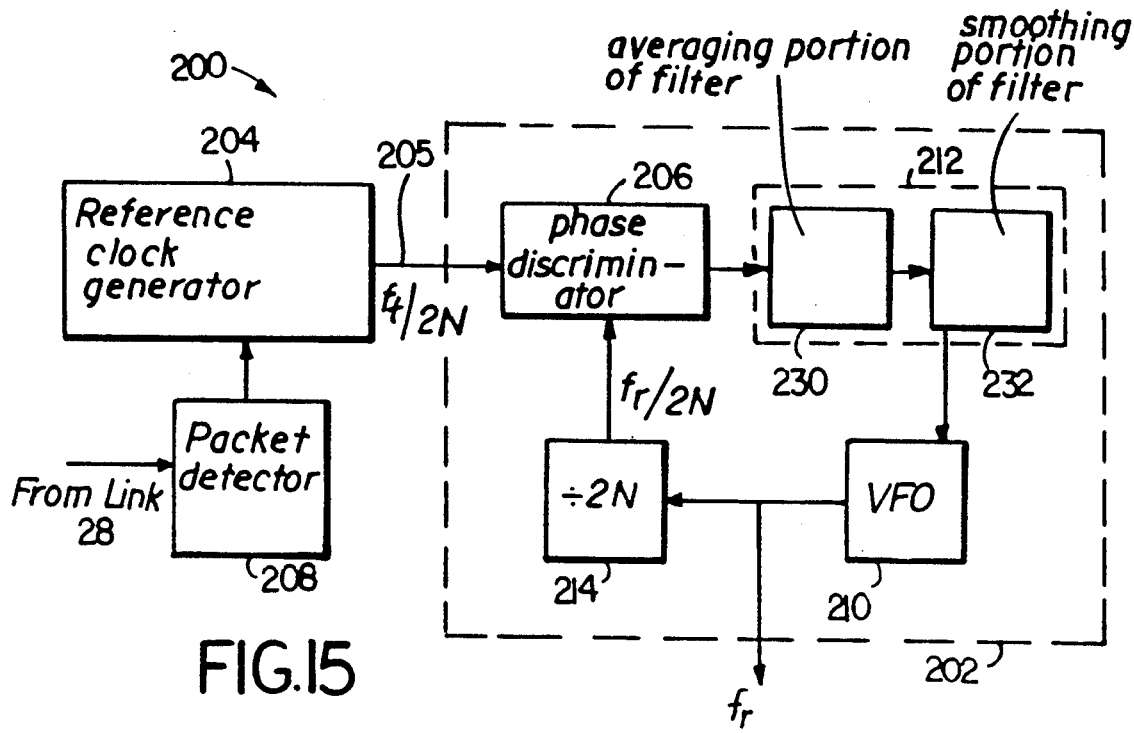

FIG. 15 is a block diagram of a second embodiment of the invention.

Figure 16:
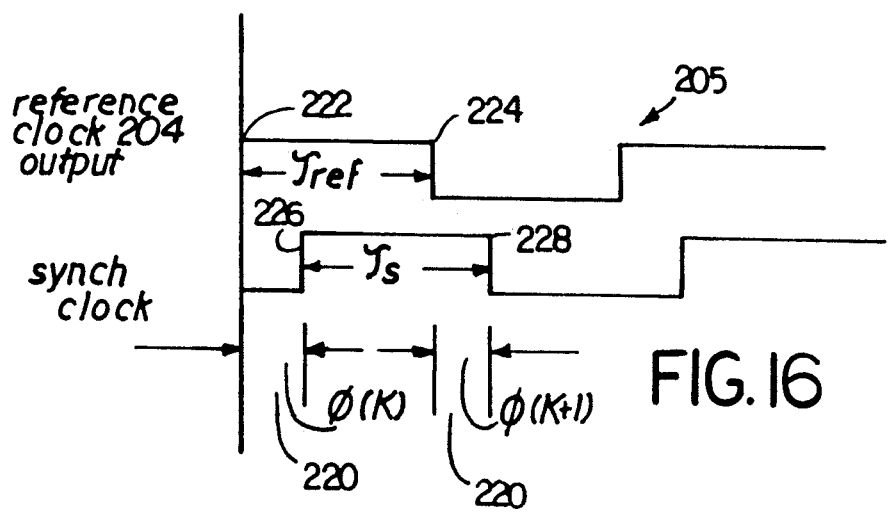

FIG. 16 is a diagram useful in understanding the operation of the system.

Figures 17, 18:
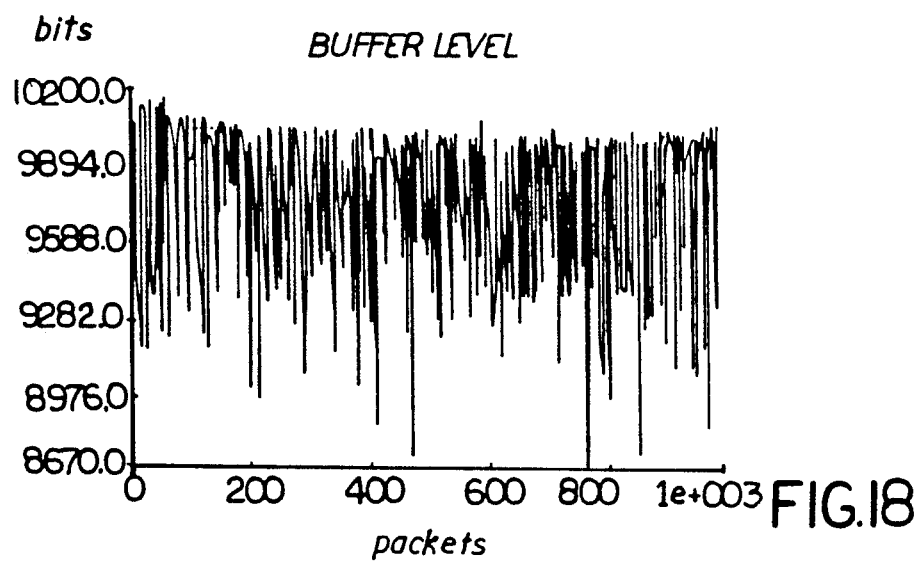

FIG. 17 is a list of equations useful in understanding the system of FIG. 15.

FIG. 18 depicts the results of a simulation useful in understanding the system of FIG. 15.

STRUCTURE AND OPERATION

Referring to FIG. 1, data communications network 10 includes nodes 12, 14, 16, 18, 20 interconnected by data links 22, 24, 26, 28, 30. Each node serves one or more continuous bit stream oriented (CBO) data terminals 32a-32g as well as other types of data terminals 34a-34f. Data is sent from one terminal (e.g. CBO terminal 32b) to another terminal (e.g., CBO terminal 32d) over a preestablished virtual circuit data path that includes the nodes which serve the two terminals (i.e., nodes 14, 18) and a combination of intervening links and nodes necessary to complete the interconnection between the terminals. One such combination includes link 26, node 20, link 30, node 16, and link 28.

Control circuitry 36 in each node 12, 14, 16, 18, 20 creates and terminates the virtual circuit data paths as needed, and multiple data paths are multiplexed onto the physical data links. Each node serves as a concentrator of data for the terminals to which it is connected, arranging data to be transmitted by a given terminal into successive "packets" and transmitting the packets over the links according to a preestablished transmission protocol (e.g., X.25, etc.).

Referring also to FIG. 2, a packet 41 of data begins with a header 42 which comprises a multibit 43 word that may identify the terminal that is transmitting the packet (e.g., CBO terminal 32b) and the node and terminal which is to receive packet 41. The header 42 is followed by a field 44 that contains the actual data that is being transmitted. The number of bits 45 in data field 44 is usually fixed and is, for example, 512 bits. Trailer field 46 includes a multibit 47 word that signals the completion of packet 41.

Referring also to FIGS. 3A-3B, CBO terminal 32b continuously sends data 40 (only segments 40a-40d of data 40 being shown) to node 14 for packetization and transmission over network 10. Note that segments 40a-40d are denoted for purposes of illustration only. CBO terminal 32b actually sends data in a single, continuous stream. The bit frequency, $f_t$, at which the transmitting terminal sends data 40 to its node is usually (but not always) fixed, e.g., at 9,600 bits/second. The period of this bit frequency is denoted as $T_t$. Node 14 packages (packetizes) segments 40a-40d and transmits them as packets 41a-41d respectively, at a relatively high frequency (such as 64,000 bits/second).

When a node (e.g., node 18) receives a packet 41 that is intended for one of the terminals served by that node (e.g., CBO terminal 32d), it depacketizes the packet into continuous data. That data is extracted by the terminal at a bit frequency, $f_r$, that, ideally, equals to the transmission frequency $f_t$ of transmitting terminal 32b. Node 18 also strips the header and trailer fields 42, 46 from the packet, stores data field 44 of the packet in buffer 37, and signals the destination terminal that a new packet has arrived. Buffer 37 has a capacity of, e.g., eight packet data fields.

Thus, received packets 41 are placed into buffer 37 (and withdrawn from buffer 37 by the destination terminal) at a bit rate, $f_r$, which, if not matched to the frequency, $f_t$, of the transmitting terminal, will cause buffer 37 to eventually overrun with data (if $f_r$ is too slow) or be emptied (if $f_r$ is too fast). The clocks in transmitting CBO terminal 32b and receiving CBO terminal 32d are independent, however, and terminals 32b, 32d provide no idle periods during which their clocks can be synchronized, e.g., by a network clock.

At the receiving node, in the absence of stochastic delay, transmission frequency $f_t$ can be determined by measuring the time interval $\Delta t$ (FIG. 3B) between the start of successive packets (e.g., packets 41a, 41b) formed by the node, so long as the total number of bits (N) in the packets is known. This follows as a consequence of the continuous transmission of data by the CBO terminal. The transmission frequency is simply: $f_t = N/\Delta t$. Thus, if the arrival rate of packets at the receiving node was a predetermined, constant rate, the transmission frequency $f_t$ could quite simply be determined. Once $f_t$ is known at the receiving node, the frequency $f_r$ of the receiving terminal is easily adjusted to match $f_t$.

Referring to FIGS. 3C-3D, because transmission from other terminals on the transmitting node (e.g., terminal 34b) are multiplexed on network 10, the arrival rate of packets 41 from CBO terminal 32b is neither constant nor predetermined. That is, network 10 introduces stochastic (i.e., random) delays in the arrival times of successive packets 41a-41d at node 18. For example, packets 50a-50e from terminal 34b are multiplexed on network 10 with CBO packets 41a-41d and cause CBO packets 41a1, 41c and 41d to arrive at node 18 later than they otherwise would have by stochastic delays $\delta(41a)$, $\delta(41c)$, and $\delta(41d)$, respectively. In this example, packet 41b has experienced no such stochastic delay.

It should be noted that the network can introduce stochastic delay for reasons besides the multiplexing just described, such as by the sharing of the link with other nodes.

The invention provides techniques for determining transmission frequency $f_t$ based on the packet times of arrival despite the stochastic delays of the packets, and adjusting the receiver frequency, $f_r$, to match the determined transmission frequency.

Referring to FIG. 4, synchronization circuitry 60 (located in the control circuitry 36 of the receiving node) determines the transmission frequency $f_t$ based on the time difference of arrival (TDOA) of successive packets in a manner described in detail below. Receiver packet detector 62 signals on line 64 the arrival of each packet from link 28 (FIG. 1), and the time of arrival between each packet in measured by TDOA calculator 66.

The time differences between the arrivals of several packets 41 are filtered by TDOA filter 68 in a manner that is selected so that the output of TDOA filter 68 (on line 69) represents a high quality estimate ($_t$) of the bit period ($T_t = 1/f_t$) produced by the transmitting terminal. This estimate of transmitter bit period drives a tracking loop 70 to cause the frequency $f_r$ produced by clock 72 (e.g., a variable frequency oscillator, VFO) to match (or very closely approximate) the frequency, $f_t$, of the transmitting CBO terminal.

Figure 5:
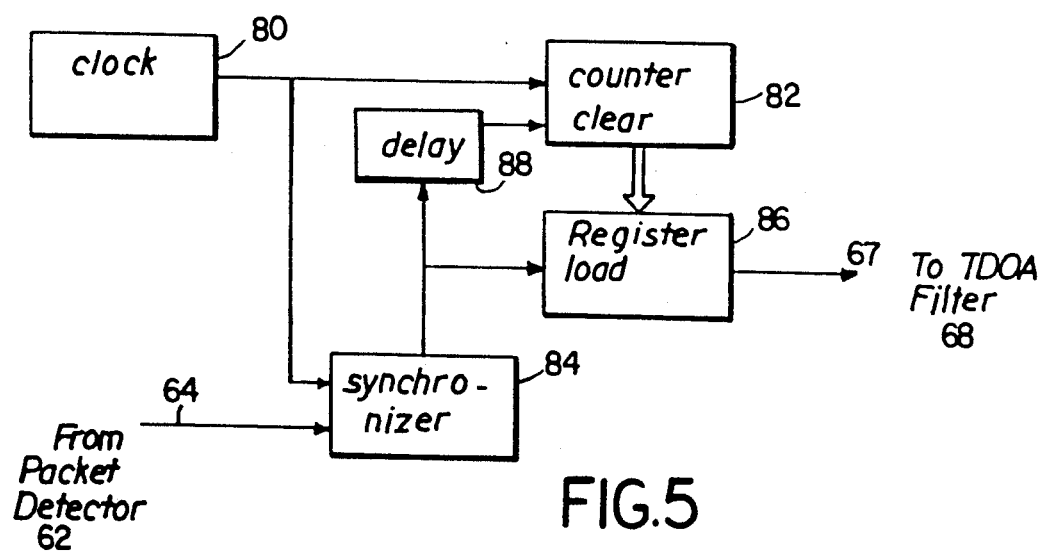
FIG. 5 is a diagram of one of the blocks of FIG. 4.

Referring to FIG. 5, TDOA calculator 66 is based on a high speed clock 80 (e.g. 16.384 MHz) that continuously increments a counter 82, the count of which indicates the interval since the previous time that a packet arrived. Synchronizer 84 responds to packet arrival signal 64 and pulses from clock 80 and causes register 16 to load (i.e., latch) the current count of counter 82 each time a new packet arrives. Synchronizer 84 also clears counter 82 after a delay 88 that is sufficient to ensure that the contents of the counter have been latched into register 86. Then counter 82 begins counting clock cycles again. The content of register 86 (which appears on line 67) is thus a measure of the time difference of arrival (TDOA) of two successive packets 41.

Referring to FIG. 6, TDOA filter 68 is arranged as a sliding window averaging filter of length W, that is, a filter that averages the TDOA measurements made by calculator 66 over the most recent W packets to arrive. Specifically, as a new TDOA is included in the average, the TDOA for the packet which arrived W packets earlier is discarded. As a result, only the W newest TDOAs are averaged.

The newest TDOA input is multiplied 92 by a constant (1/W), where W is the number of TDOA measurements included in the average. The product of this multiplication is added 94 to the current averaged TDOA value in an accumulator 96. TDOA filter 68 includes a W-stage shift register 90 into which the multiplier 92 output values are shifted. As the most recent multiplier 92 output is shifted into the first stage 90a of shift register 90, the Wth prior value is shifted out of the last stage 90W and subtracted 100 from the result produced by adder 94. This operation effectively removes the Wth previous TDOA value from the average and results in accumulator 96 containing the average of only the most recent W TDOA measurements.

The content of accumulator 96 is a sample average of the W TDOA measurements and, for reasons developed in detail below, when divided by N (as accomplished by appropriately selecting the gain 74 in tracking loop 70) represents a high quality approximation, $t_t$, of the transmitting CBO terminal bit period.

Note that choosing W to be a power of two (i.e. $W=2^n$ makes it is possible to implement (1/W) multiplication 92 simply with a shifter. Further, it is alternatively possible to move the division by W into tracking loop 70 by reducing the gain 74 within the loop by a factor of W, as will be discussed below.

Referring also to FIG. 3D, to understand how the transmitters's bit rate $f_t$ can be determined from the averaged TDOA measurement produced by TDOA calculator 66 and TDOA filter 68, note that the time difference of arrival ($\Delta t$) between two consecutive received packets, for example, packet 41c and packet 41d, is given by the formula:

$$\Delta t = N/f_t + \delta(41d) - \delta(41c) \quad (1)$$

where $N/f_t$ is equal to the time length of a packet. In general, the time difference of arrival between any two adjacent packets (k) and (k−1) is:

$$\Delta t(k) = N/f_t + \delta(k) - \delta(-1) \quad (2)$$

where $\delta(k)$ is the stochastic delay suffered by packet (k) on network 10 and $\delta(k-1)$ is the stochastic delay suffered by packet (k−1).

Because $1/f_t$ is simply the bit period $T_t$ of the transmitting CBO terminal, equation (2) can be rewritten as:

$$\Delta t(k) = NT_t + \delta(k) - \delta(k-1) \quad (3)$$

As discussed, the delay suffered by each packet is assumed to be random, due to the nature of packet transmission on network 10. The delay experienced by each packet is also assumed to be independent of that suffered by other packets, and the packet delays are identically distributed and stationary. Thus, the kth and (k−1)th packets have an expected time difference of arrival, $E[\Delta t(k)]$ that is given by:

$$E[\Delta t(k)] = E[NT_t + \delta(k) - \delta(k-1)] \quad (4)$$

which is equivalent to:

$$E_\delta[\Delta t(k)] = E_\delta[NT_t] + E_\delta[\delta(k) - \delta(k-1)] \quad (5)$$

That is, the expected TDOA of the kth and (k−1)th packets equals the expected value of $NT_t$ plus the expected difference of the stochastic delays of the kth packet and the (k−1)th packet. However:

$$E_\delta[\delta(k) - \delta(k-1)] = 0 \quad (6)$$

because the mean network delay is assumed to be constant. Further, the expression $NT_t$ is a constant and thus has an expected value of $NT_t$. Thus, equation (5) reduces to:

$$E_\delta[\Delta t(k)] = NT_t \quad (7)$$

or:

$$T_t = E_\delta[\Delta t(k)]/N \quad (8)$$

It is seen from equation (8) that the bit period $T_t$ of the transmitting terminal is determined by finding the expected value of the TDOA measurements and dividing it by the (already known) packet length. Once $T_t$ is determined, its inverse, the transmission rate $f_t$, is easily derived.

The expected delay $E_\delta[\Delta t(k)]$ is theoretical and therefore unobservable. Therefore, a sample average TDOA value, $\overline{\Delta t}(k)$, provided by TDOA filter 68 is used to yield an estimate, $t_t$, of the transmitted bit period $T_t$. The sample average TDOA value 69 that is found by taking a sliding average over a window of W TDOA values (FIG. 5) provides a very accurate estimate, $T_t$.

Referring also to the list of equations in FIG. 7, TDOA filter 68 produces a sample average value $\overline{\Delta t}(k)$ in accordance with equation (9) that is an approximation of the expected value of $\Delta t(k)$ in equation (8) (i.e. $E_\delta[\Delta t(k)]$). Sample average ($\overline{\Delta t}(k)$) is equal to the sum of the delays ($\Delta t(k)$) over W TDOA measurements (i.e., samples) divided by W. Thus, dividing average $\overline{\Delta t}(k)$ by N (the number of bits in a packet) (equation (10)), produces an unbiased estimate, $t_t$, of $T_t$ that is as good as the quality of the approximation for $E_\delta[\Delta t(k)]$ yielded by $\overline{\Delta t}(k)$.

Because only a finite number of TDOA values are averaged, statistical fluctuations in the packet arrival times will cause the estimate $t_t$ of the transmitter bit period to deviate from the actual transmitter bit period $T_t$. The error between the estimated and actual transmitter bit periods, normalized to the actual value of $T_t$ (equation (11)) yields the jitter $J(k)$ (or the error) of the estimate. The jitter is a consequence of using a sample average in place of the theoretical value of $E_\delta[(\Delta t(k)]$. The magnitude of the jitter is inversely proportional to the number, W, of TDOA measurements averaged by TDOA filter 68. A large W value decreases jitter, but at the expense of filter complexity and perhaps processing time.

As shown by equation (12) the transmitter bit period estimate $t_t(k)$ for any packet (e.g , the kth packet) equals the actual bit period, $T_t$, modified by the average stochastic delay difference between adjacent packets divided by the number of bits within a packet (i.e., $\overline{\Delta\delta}(k)/N$). The goal is to select W so that the expected absolute value, or the RMS value, or any other appropriate measure of the jitter, $J(k)$, is less than a predetermined maximum jitter value, $J_{max}$ (equations (13, 15)).

One way of determining the size of the sample W that is required to keep the jitter below $J_{max}$ is based on the square jitter, which is defined by equation (14). As shown by equation (15), the expected value of the square jitter $(J(k)^2)$ must be less than or equal to the square of $J_{max}$. Substitution of equation (12) into equation (15) allows the expected value of the square jitter to be expressed in terms of the average delay $\overline{\Delta\delta}(k)$ between adjacent packets, as shown in equation (16) The average delay $\overline{\Delta\delta}(k)$ is a function of the number W of TDOA measurements averaged by filter 68 (equation (17)).

The expected value of the delay of the kth packet ($E\{\delta(k)\}$) is defined as $\mu_\delta$ (equation (18)). Thus, the value $\overline{\Delta\delta}(k)$ as expressed in equation (17) can be described in terms of $\mu_\delta$ simply by adding and subtracting $\mu_\delta$ from the right side of that equation as shown in equations (19) and (20). Squaring $\overline{\Delta\delta}(k)$ results in equation (21).

The expected value of $\overline{\Delta\delta}(k)^2$ as expressed in equation (21) is shown in equation (22). However, by definition, the expectation of the squared deviation of a value from its expected value (e.g. $(\delta(k)_2 - \mu_\delta)^2$) square of the standard deviation, $\sigma_\delta^2$ of the value. Thus, as shown in equation (23), the expected values $E[(\delta(k) - \mu_\delta)^2]$ and $E[\delta((k-W) - \mu_\delta)^2]$ both reduce to $\sigma_\delta^2$. Equations (24)–(26) show that the remaining term in the right hand side of equation (22) (i.e. $-2E[[\delta(k) - \mu_\delta][\delta((k-W) - \mu_\delta)]]$) reduces to zero. The bracketed expression in this remaining term is expanded in equation (24), and the expected value taken, as shown in equation (25). However, $E[\delta(k)\delta(k-W)]$ is $\mu_\delta^2$, simply a constant. $E[\mu_\delta^2]$ and equals $E[\delta k = w]$ and $E[\delta(k)]$ $E[(\delta(k-)]$, which also equals $\mu_\delta$. Therefore, equation (25) is reduced as shown in equation (26) and equals zero.

Therefore, as shown in equation (27), the expected value of the average difference in delays squared equals twice the square of the standard deviation divided by $W^2$. Substituting this expression into (16) yields the following equation relating TDOA filter order W and jitter:

$$\frac{2\sigma_\delta}{W^2} \leq J_{max}^2 N^2 T_t^2 \qquad (28)$$

or $$W \geq \frac{\sigma_\delta \sqrt{2}}{NT_t J_{max}} \qquad (29)$$

As long as W satisfies this inequality, the RMS jitter in $t_r$ and hence in the corrected receiving terminal bit rate, $f_r$, can also be less than $J_{max}$ through an appropriate choice of gain, G, 74 in the tracking loop.

Referring to the list of equations in FIG. 8, if the delay distribution $\Delta\delta$ of network 10 is known, then a sample size W can be chosen in an alternative manner to that discussed above to maintain the resulting jitter less than some predetermined maximum jitter, $J_{max}$, to within a given confidence level $\alpha$ (e.g. to within 95%). In this case, the sample size W is selected so that the probability, P, that the magnitude of the jitter will be less than or equal to $J_{max}$ is greater than that level of confidence, $\alpha$, as shown by equation (30).

This probability can be rewritten in terms of a probability distribution function $F_k(a)$ (equation (31)) where (a) is less that $|J_{max}NT_t|$. Letting $F_k(a)$ equal the probability distribution function of the average difference of stochastic delays $\overline{\Delta\delta}(k)$, then by definition:

$$F_k(a) = P[\overline{\Delta\delta}(k) \leq a] \qquad (32)$$

Substituting the expression for $\overline{\Delta\delta}(k)$ given by equation (17) into equation (32) yields:

$$F_k(a) = P[\delta(k) - \delta(k-W) \leq aW] \qquad (33)$$

Because $\delta(k)$ and $\delta(k-W)$ are independent identically distributed (iid) random variables, the probability expressed by the right hand side of equation (33) is defined by the distribution function $F_{\Delta\delta(aW)}$, where $F_{\Delta\delta}$ is the probability distribution function of $\Delta\delta(k)$. Knowing the distribution function $F_k(a)$ allows the density function $f_k(a)$ to be generated by simply taking the derivative of $F_k(a)$ with respect to the variable (a). That is:

$$F_k(a) = F_{\Delta\delta}(aW) \qquad (34)$$

$$f_k(a) = W f_{\Delta\delta}(aW) \qquad (35)$$

The probability density function of the delay distribution $\Delta\delta$ (i.e., $f_{\Delta\delta}(d)$) is determined by taking the convolution of the density functions of the delays $f_\delta(d)$ and $f_\delta(-d)$ (equation (36)), where (d) is the variable over which the distribution is taken.

The density function for the network $f_\delta(d)$ is often known. For example, in a network with a delay that is exponentially distributed, (e.g. a network obeying the M/M/1 queuing model) the density function is given by equation (37), where $\mu$ is the reciprocal of the mean value of the distribution. Therefore, the density function for the differences in the delays ($f_{\Delta\delta}(d)$), which is found by convolving the network density function as shown in equation (36), yields the result given by equation (38). The density function, $f_k(a)$, as expressed in equation (39), (which is derived by substituting equation (38) into equation (35), is then be integrated over (k) to generate the distribution function $F_k(a)$. Once the distribution function is determined, it is substituted into equation (31) and solved in terms of the confidence level $\alpha$, and the sample size W.

If the delay distribution of network 10 is not known, a value for W may still be found by applying the central limit theorem. Although two consecutive differential delays are correlated, removing intermediate values from the time series represented by equation (17) (i.e., decimating the time series) makes the time series values independent For example, both $\Delta\delta(1)$ and $\Delta\delta(2)$ depend upon $\delta(1)$ and so are correlated. Removing $\Delta\delta(2)$ from the series and considering only $\Delta\delta(3)$ and $\Delta\delta(1)$ results in independent identically distributed (iid) random variables. So as long as the decimation factor is at least two, (i.e., at least every other value is removed), the central limit theorem can validly be applied to the remaining independent variables.

The central limit theorem means that the distribution $\overline{\Delta\delta}(k)$ converges to a normal distribution with zero mean and a variance of:

$$E[(\overline{\Delta\delta}(k))^2] = \sigma_\delta^2 / W \qquad (40)$$

where now W is the number of TDOA values used in forming the average (equation (9)) from the decimated time series Equation (16) has been rewritten as equation (41). Substituting equation (40) into equation (41) yields the following expression for W that, if satisfied, results in RMS jitter being maintained below $J_{max}$:

$$W \geq (\sigma_\delta / J_{max} NT_t)^2 \qquad (42)$$

By using the central limit theorem, equation (31) can be recast in terms of the percentile of the standard normal distribution $\phi(x)$ as equation (43).

Referring to the list of equations in FIG. 9, note that although the packets are most often of fixed length (N), the packet length is varied (either in a known manner or stochastically) in some applications. In this case, TDOA filter 68 averages over the stochastic packet length N(k)

as well as over the stochastic delay distribution discussed above That is:

$$\Delta t(k) = N(k)T_t + \delta(k) - \delta(k-1) \qquad (44)$$

where the length of the packet N(k) is variable. The estimated value, $\overline{\Delta t}(k)$, of $\Delta t(k)$, formed by applying equation (44) to equation (9) (FIG. 7), is expressed in equation (45), which can be separated into two separate summations, as shown in equation (46). The first summation represents the average length of the packet (i.e., N(k)) multiplied by $T_t$ and the second summation corresponds to the average difference in the delays $\overline{\Delta \delta}(k)$ As discussed above, the expected value of the average difference in the delays $\overline{\Delta \delta}(k)$ is zero, as shown in equation (46a). Therefore:

$$\overline{\Delta t}(k) = \overline{N}(k)\hat{T}_t \qquad (47)$$

$$\text{or } \hat{T}_t = \overline{\Delta t}(k)/\overline{N(k)} \qquad (48)$$

Because the sample average, $\overline{N}(k)$ is measured, there is no additional uncertainty introduced into the estimated value, $_t$. Therefore the sample average length of the packet contributes no additional uncertainty to the transmitter bit period estimate $_t$.

The behavior of the techniques of this invention in determining the estimate of the transmitter rate in the presence of lost packets can be considered by treating a lost packet as an inordinately large network delay that leads to an error in the estimation of $T_t$. The error in the estimation of $T_t$ leads to an increase in the level of buffer 37 (FIG. 1) which compensates for the buffer depletion due to packet loss. That is, the receiving node treats the loss of a packet as if the transmitter had decreased its transmitting rate.

To see how this error affects the buffer level, assume that a packet is lost at time L, inducing an error $NT_t$ in a single TDOA measurement made by calculator 66. Then, if TDOA filter 68 requires W samples, the amount of error in the average $\overline{\Delta t}(k)$, between times (L) and (L+W−1), is $NT_t/W$.

Because tracking loop 70 is linear the incremental effect of this error on the buffer level can be determined by considering the response of tracking loop 70 to the pulse function $(u(L) - u(L+W))(NT_t/W)$ (where the pulse is formed by using u(L) and u(L+W), the discrete unit step functions at (L) and (L+W), respectively) that is, considering the response of tracking loop 70 to an error which persists for W samples. Because the estimates $_t$ that drive loop 70 are of high quality (as discussed above), a first or second order loop is sufficient for tracking, and in fact, with TDOA filter 68 designed as discussed above, a first order loop is often sufficient. To determine the effect of the error, the response of tracking loop 70, which is a first order loop, must be determined.

The estimate $_t$ generated by TDOA filter 68 provides the driving function for tracking loop 70. Adder 73 sums the estimate of $T_t$, $_t$ with the negative of the period, $T_r$, of the output frequency of VFO 72, as produced by converter 76. When this sum is nonzero, it represents an error between the frequency setting $f_r$ of the receiving terminal and the estimate of the transmitting terminal frequency (i.e., 1/$_t$). This error signal provides the input to an amplifier 74 that has a gain G selected as described below. The amplified error signal is filtered by loop smoothing filter 75 and applied to control the variable frequency oscillator (VFO) 72.

Referring to FIG. 10, converter 76 changes the frequency produced by VFO 72 into a number that corresponds to the bit period ($T_r$) of VFO 72 for use as the negative input to adder 73. The output of VFO 72 is applied to a synchronizer 110 along with pulses from a high speed (e.g., 16.384 MHz) clock 112. Synchronizer 110 synchronizes the edges of the VFO 72 to the edges of the high speed clock 112. Edge detector 114 generates a pulse output on the rising edge of the synchronizer 110. This pulse causes register 116 to load the current count of counter 118, which increments in response to pulses from clock 112. This pulse also clears counter 118 after a delay 120 sufficient to allow register 116 to capture the contents of the counter 118. The number given by counter 118 corresponds to the period, $T_r$, of the output signal of VFO 72.

Because tracking loop 70 is a first order loop, it obeys the difference equation:

$$T_r(k) = T_r(k-1) + G[\hat{}(k) - T_r(k-1)] \qquad (49)$$

where G is the loop gain, $T_r(k-1)$ is the receiver bit period after the (k−1)th packet arrival, $T_r(k)$ is the estimated transmitter period after the kth packet arrival, and $T_r(k)$ is the estimated transmitter period after the kth packet arrival. If the error in the estimation of the transmitter packet arrival period is 0 (the ideal case), the difference between $_t$ and $T_r(k-1)$ (i.e., the output of adder 73) goes to 0. Further, such a loop is stable for gains between zero and two (i.e., 0<G<2). Note that for G=1, the receiver bit rate $T_r(k)$ equals to the estimated transmitter bit rate $_t(k)$, effectively eliminating the smoothing effects of the loop. For G=1, the loop can be eliminated and the estimate $_t$ used directly. Again, it must be remembered that the gain of the loop, G, must be reduced by a factor (1/N) to take into account the division by N if it was not explicitly included in TDOA filter 68. Further, depending upon the TDOA filter chosen, it may be possible to reduce the gain to take into account the multiplication by the constants of the filter, if the constants were not explicitly included in the TDOA filter. For example, the gain for the sliding window averaging filter may be reduced by 1/W if the multiplication by 1/W was not included in the filter.

Referring to the list of equations in FIG. 11, the loop response is given by equation (50). When CBO terminal 32b transmits at a constant bit rate $T_t$, equation (51) gives the loop response where $\epsilon(k)$ is the estimation error in $_t$. Therefore, the incremental response R(k) to the error pulse driving function discussed earlier is given by equation (52).

In solving this equation, there are three regions of interest; (1) the time prior to when the error occurred (i.e., k<L); (2) the time during the pulse from when the error first appeared until W samples later when the error has propagated through the average (i.e., L≤k<L+W), and (3) the time when the error has passed through the average and the recovery from the pulse is taking place (i.e., k≥L+W). During the error pulse, R(k) grows according to equation (53) and then decays following the $W^{th}$ sample after the error has occurred in accordance with equation (54). Prior to the error there is no pulse for the function to respond to since the error is the only driving function in this example (equation (55)).

Therefore, the error in $T_t(k)$ first increases over the W timesteps during which $\overline{\Delta t}(k)$ is affected; then, the effect of the error exponentially decays to 0. This error will result in an increased TDOA measurement and a higher than normal estimate $_t$, i.e. decreased transmission rate estimate, with a resulting increase in the buffer level. To determine how much the buffer grows as a result of the error, simply sum the response from the point the packet was lost, i.e., sum the incremental response from 0 to infinity as shown in equation (56), keeping in mind that there is no response prior to time (L).

Substituting into equation (56) the values of R(k) from equations (53) and (54) yields equation (57), which is expanded and consolidated in accordance with equation (58) to give equation (59). The lower limit on the summation in equation (57) is set to zero (without any loss of generality) by assuming that (L) equals zero. Rewriting (k−W) as the variable l in both the exponent of the last term and the limit on the sum on that last term gives equation (60), the last two sums of which cancel, leaving the first sum, which equals $T_t$ (equation (61)).

In performing these summations it is seen that the buildup of error occurs over a period of time equal to the error in the TDOA measurement, $T_t$. Because buffer 37 is also being emptied during the period over which the packet was lost, the net effect is to reestablish a nominal buffer level. This technique therefore controls the buffer level implicity.

It is also apparent that the technique is unaffected by out of sequence packets, as long as the fact that the packets are out of sequence is detected, (e.g., by the use of sequence numbers). The method must then also accommodate for the negative differential delay which arises because of the arrival of packet (k) before packet (k−1). It is easily seen that as long as the packets can be sequenced, the proper delay can be determined.

The performance of this technique can be seen by comparing the simulations of FIGS. 12A and 12B. FIG. 12A depicts a simulation of packet network 10 in which the gain 74 in the tracking loop 70 is set to 0 (i.e., no tracking) and in which the receiver bit rate exceeds the transmitter bit rate by 0.01%. In this simulation, the buffer size was set to 10,000 bits initially. Notice that there is a steady (linear) decrease in buffer size.

FIG. 12B shows the same simulation with the gain 74 set to 0.1 and with the order of TDOA filter 68 (i.e., W) set to 50. The buffer in this case shows no steady decrease and an immediate recovery from any low buffer condition caused by long stochastic delays. In these simulations, convergence is seen (FIG. 12B) to be very fast with the averaging performed in only 50 packets. The spikes in FIG. 12B are caused by stochastic delays in the network. Note that the technique recovers from these deviations quickly.

OTHER EMBODIMENTS

Other embodiments are within the scope of the claims.

For example, and referring to FIG. 13, TDOA filter 68 may alternatively be implemented to perform a growing memory average to provide the estimate $_t(k)$. Each new TDOA measurement 67 is added 130 to the product 132 of the current average TDOA measurement value (contained in accumulator 134) and the number of packets (i.e., samples) that have been taken. The product taken by multiplier 132 represents the total TDOA of all the packets prior to the current one, and is loaded into register 137 each time a new packet arrives. The number of samples taken is maintained in a counter 136 which also is incremented by packet detector 62 (FIG. 4) each time a new packet arrives. The sum 130 of the new TDOA measurement 67 and the accumulated prior TDOA average is divided 138 by the total number of packets (from counter 136) which now includes the present packet in that count. The result of this division is the new average TDOA measurement, which is stored in accumulator 134, and also provides the updated estimate $_t(k)$ when divided by N of transmitter bit period.

Referring to FIG. 14, another embodiment of TDOA filter 68 is as an exponential smoothing filter. This filter generates a weighted average of the TDOA measurement, giving greater weight to the most recent samples in accordance with the following expression, which is the exponential form of equation (9):

$$\overline{\Delta t}(k) = (1-\lambda)\overline{\Delta t}(k-1) + \lambda \Delta t(k) \qquad (61a)$$

where $\lambda$ is a constant between 0 and 1.

It is important to note that the exponential filter provides an unbiased estimate of $T_t$ and is easier to implement than the sliding window average (FIG. 6) because only one previous sample need be retained. Each TDOA measurement 67 is multiplied 140 by a constant, $\lambda$, and the product added 142 to the product 144 of the current average TDOA measurement value contained in accumulator 148 and another constant $(2-\lambda)$. This sum becomes the new average TDOA measurement value in accumulator 146, which again represents the estimate $_t(k)$ when divided by N.

Whichever implementation is chosen for TDOA filter 68 (i.e., that shown in FIGS. 6, 13, or 14), TDOA filter 68 provides an estimate of $E_\delta[\Delta t(k)]$ (equation (8)) and thus, strictly speaking, does not give $_t$, which is $E_\delta[\Delta t(k)]/N$. Rather than performing this division in TDOA filter 68, the gain 74 of tracking loop 70 is reduced by a factor of N. The results are equivalent and this avoids adding complexity to TDOA filter 68.

Although several hardware embodiments of TDOA filter 68, have been discussed, each can alternatively be implemented as a TDOA filter algorithm and executed in a microprocessor to provide the estimate $_t$. Also, much of the tracking loop can be performed in the microprocessor.

Referring to FIG. 15, an alternative arrangement 200 for synchronizing the receiving terminal frequency $f_r$ to transmission frequency $f_t$ uses a phase lock loop 202. A reference clock generator 204 generates a transition in its output 205 each time that packet detector 208 senses the arrival of a packet from link 28 (FIG. 1). The reference clock signal 205 provides one input for a phase discriminator 206. Phase discriminator 206 also receives as its other input the output of VFO 210 divided 214 by 2N. Phase discriminator 206 in turn drives VFO 210 via filter 212, which is described in detail below.

Successive packet arrival signals from detector 208 cause reference clock generator 204 to generate alternating positive going and negative going transitions. Thus, clock 204 produces a signal with a frequency equal to one half of the packet arrival rate. Because each packet is N bits long, it is seen that reference clock 204 operates at the frequency of the transmitter $f_t$, divided by 2N. Thus, the output of VFO 210 is divided 214 by 2N before being applied to phase discriminator 206. It should be noted that alternatively, the division is by 2 mN in the case of decimation, whereby decimation is meant that rather than causing a reference transition on every packet, a reference transition occurs on every mth packet.

Ideally, VFO 210 oscillates at the transmitter frequency $f_t$. When this is the case, the signal that it applies to phase discriminator 206 via divider 214 matches the frequency of reference clock 204. Any differences between the transmitter frequency, $f_t$, and the VFO frequency, $f_r$, are removed over time by the phase lock loop 202, as discussed below.

Referring also to FIG. 16, phase discriminator 206 indicates the time differences (i.e. phase errors $\Phi$) 220 between each reference clock transition 222, 224 and the immediately following sync clock transition 226, 228 of the output of divider 214. Denoting the length of the kth reference clock pulse as $T_{ref}$, the length of the pulse from divider 214 as $T_s$, the phase error associated with the previous pulse as $\Phi(k)$, and the phase error associated with the current pulse as $\Phi(k+1)$, then from FIG. 12 it is seen that $$\Phi(k) + T_s = T_{ref} + \Phi(k+1) \tag{62}$$

or $$\Phi(k+1) = T_s + \Phi(k) - T_{ref} \tag{63}$$

Referring also to the list of equations in FIG. 17, period $T_s$ is equal to N times the receiver clock period $T_r(k)$ (equation (64)) for the kth packet, and the reference period $T_{ref}$ is the nominal transmitter period $T_t$ multiplied by the number of bits in the packet (i.e., $NT_t$), modified by an error which is a function of the difference in the delays $\delta$ of successive packets, as shown by equation (65). Substituting equations (64) and (65) into equation (63) yields the expression of equation (66) for the difference in phase between any two adjacent packets (i.e., $\Delta\Phi(k+1) = -\Phi(k)$).

When loop 202 is locked, $\Delta\Phi(k+1)$ is zero Likewise, in the absence of stochastic delays, $\delta(k) - \delta(k+1) = 0$ and therefore $T_r(k) = T_t$. However, in the presence of stochastic delays this is not the case. To remove the effects of the stochastic delays, loop filter 212, which may include an averaging filter 230 and a smoothing filter 232, forms the time average of $\Delta\Phi(k)$, $\overline{\Delta\Phi}(k)$, in much the same manner as TDOA filter 68 (FIG. 4) averages the time differences of packet arrivals. Thus, averaging filter 230 can be implemented in any of the ways discussed above for TDOA filter 68. Filter 212 also includes (possibly as part of averaging filter 230) a smoothing filter 232 for smoothing the response of phase lock loop 202.

The output of filter 212 is thus proportional to the average phase error. Therefore:

$$T_r(k) = T_r(k-1) + G\overline{\Delta\Phi}(k) \tag{67}$$

where $T_r(k)$ is the receiver bit period for the kth packet, $T_r(k-1)$ is the receiver bit period for the (k−1)th packet and G represents the gain of loop 202.

FIG. 18 shows the results of a simulation of the technique illustrated in FIG. 15 in which the buffer level was started at 10,000 bits. The mean delay was 0.2 seconds exponentially distributed; the gain of the loop (G) was 0.01; the loop filter was an averaging filter of order 50; the packet size was 2,000 bits; and the frequency of the receiver exceeded the transmitter frequency by 1 Hz, (1201 Hz and 1200 Hz respectively). Again it can be seen that the buffer level rapidly settles to a stable level. Again, the spikes in the buffer level are indicative of the stochastic nature of the delays.

It is possible that the buffer level in the receiving node could change due to errors occurring within the receiving node that are unrelated to the arrival of packets. In this situation, techniques of the invention would stabilize the level at the new buffer level which formed because of the node error. As an alternative, controller 36 (FIG. 1) could periodically monitor the level of buffer 37. If the level is within given limits, for example between 25% and 75% of buffer capacity, the method of monitoring the packet arrival times controls the buffer level in the manner discussed above. If the buffer level falls outside these prescribed limits, the controller 36 would adjust the receiver clock directly to bring the buffer level within the prescribed limits. Once the level was returned, the receiver clock would once again be controlled by the techniques of monitoring packet arrivals described above.

Other combinations of buffer level monitoring and time difference of arrival measurements are also possible.

I claim:

1. A method for controlling the frequency of a clock for a receiving terminal based on a predetermined clock frequency of a terminal that produces a continuous stream of data at a predetermined frequency for transmission to the receiving terminal over a communications network of the kind in which data is transmitted between the terminals in discrete packets that are delayed on the network by possibly different amounts, comprising:
   detecting arrivals of packets that are sent to the receiving terminal,
   determining time intervals between the arrivals of successive said packets,
   processing said time intervals to generate an estimate that is related to said predetermined frequency, and
   controlling said frequency of said receiving terminal clock in response to said estimate.

2. The method of claim 1 further comprising determining said time intervals by measuring a time differences of arrival between said successive packets, and filtering said measured time differences of arrival to generate said estimate.

3. The method of claim 2 wherein said estimate is an estimate of the period of said predetermined frequency.

4. The method of claim 3 further comprising
   determining an error between said period estimate and a current period of the clock frequency for said receiving terminal, and
   adjusting the frequency of said receiving terminal clock to cancel said error.

5. The method of claim 4 wherein said error determining step and said adjusting step are performed in a first order tracking loop that includes said receiving terminal clock.

6. The method of claim 2 wherein said measuring, filtering, and controlling steps are performed each time that a packet arrives to adaptively control the frequency of said receiving terminal clock.

7. The method of claim 2 wherein said filteing includes averaging said measured time differences of arrival over a predetermined number, W, of packets that have arrived.

8. The method of claim 7 wherein said average is determined only for the W most recent packets that have arrived.

9. The method of claim 7 wherein W is selected to maintain said jitter below said predetermined level.

10. The method of claim 9 wherein W is selected so maintain said jitter below said predetermined level within a predetermined level of confidence.

11. The method of claim 2 wherein said filtering includes exponentially averaging said measured time differences of arrival.

12. The method of claim 2 wherein said filtering includes performing a growing memory average on said measured time differences of arrival.

13. The method of claim 11 or 12 wherein said averaging is performed over all packets that have arrived.

14. The method of claim 11 or 12 wherein said filtering is performed in a processor that executes a computer program on said measured time differences of arrival to perform said averaging.

15. The method of claim 7, 11, or 12 wherein said filtering is performed in a processor that executes a computer program on said measured time differences of arrival to perform said averaging.

16. The method of claim 2 wherein said time differences of arrival comprise a time series of values, and further comprising decimating said time series by a predetermined factor prior to said filtering.

17. The method of claim 1 further comprising generating a reference signal that indicates the arrival of each said packet,
determining each said time interval by measuring phase differences between said reference signal and said receiving terminal clock, and
filtering said measured phase differences to generate said estimate.

18. The method of claim 17 wherein said estimate is an estimate of a difference between said predetermined frequency and the frequency of said receiving terminal clock.

19. The method of claim 17 wherein said generating, measuring, filtering, and controlling steps are performed each time that a packet arrives to adaptively control the frequency of said receiving terminal clock.

20. The method of claim 17 wherein said filtering includes averaging said measured phase differences over a predetermined number, W, of packets that have arrived.

21. The method of claim 20 wherein said average is determined only for the W most recent packets that have arrived.

22. The method of claim 20 wherein W is selected to maintain a jitter in said estimate below a predetermined level.

23. The method of claim 22 wherein W is selected to maintain said jitter below said predetermined level within a predetermined level of confidence.

24. The method of claim 17 wherein said filtering includes exponentially averaging said measured phase differences.

25. The method of claim 17 wherein said filtering includes performing a growing memory average on said measured phase differences.

26. The method of claim 24 or 25 wherein said averaging is performed over all packets that have arrived.

27. The method of claim 17, 24, or 25 wherein said filtering is performed using a hardware filter.

28. The method of claim 17, 24, or 25 wherein said filtering is performed in a processor that executes a computer program on said measured phase differences to perform said averaging.

29. The method of claim 17 further comprising adjusting the frequency of said receiving terminal clock to cancel said difference between said predetermined frequency and the frequency of said receiving terminal clock.

30. The method of claim 29 wherein said measuring, filtering, and adjusting steps are performed with a phase lock loop that includes said receiving terminal clock and that is driven by said reference signal.

31. The method of claim 17 wherein said phase differences comprise a time series of values, and further comprising decimating said time series by a predetermined factor prior to said filtering.

32. The method of claim 31 wherein said reference signal has a frequency that represents said predetermined frequency divided by 2 mN, where m is said predetermined factor, and N is a number of data bits in each packet, further comprising
dividing the frequency of said receiving terminal clock by 2 mN.

33. The method of claim 17 wherein said reference signal has a frequency that represents said predetermined frequency divided by 2N, where N is a number of data bits in each packet, further comprising
dividing the frequency of said receiving terminal clock by 2N before measuring said phase differences.

34. The method of claim 1 wherein said terminal is a continuous bit stream terminal.

35. The method of claim 1 wherein said controlling adjusts the clock frequency of the receiving terminal to approximately that of the predetermined frequency.

36. The method of claim 1 further comprising
storing said packets that have arrived in a buffer for retrieval by said receiving terminal,
monitoring the number of packets that are stored in said buffer to determine if said number is within a predetemined range, and
if said number is not within said predetermined range, changing the frequency of said receiving terminal clock without regard to said estimate until said number is within said predetermined range.

* * * * *